UNITED STATES PATENT OFFICE.

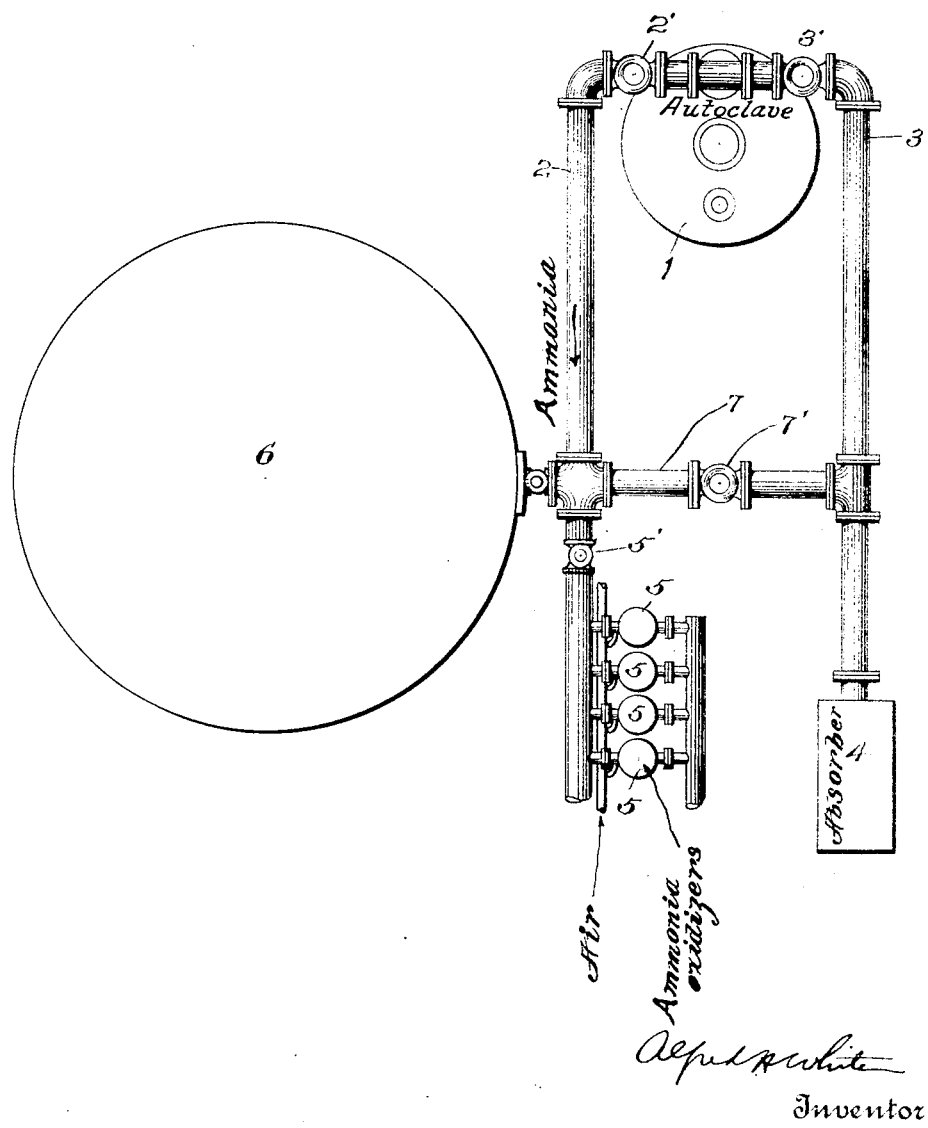

ALFRED H. WHITE, OF WASHINGTON, DISTRICT OF COLUMBIA.

PROCESS OF MAKING OXIDS OF NITROGEN.

1,370,867. Specification of Letters Patent. Patented Mar. 8, 1921.

Application filed June 19, 1919. Serial No. 305,336.

*To all whom it may concern:*

Be it known that I, ALFRED H. WHITE, a citizen of the United States, stationed at Washington, D. C., have invented an Improvement in Processes of Making Oxids of Nitrogen, of which the following is a specification.

This invention relates to improvements in the process of manufacturing nitric acid from calcium cyanamid, cyanids, nitrids or other products from which ammonia is commonly generated by treating the same in an autoclave with water containing alkali, which is heated under pressure to a temperature above the normal boiling point of water.

It is well known that ammonia may be oxidized to make oxids of nitrogen and ultimately nitric acid, by mixing the ammonia with air and passing the mixture over a catalyst usually of platinum gauze, maintained at a red heat. When, however, the ammonia is generated from cyanamid, cyanids, nitrids and the like which contain carbids, phosphids and silicids, the gaseous impurities evolved with the ammonia, for example, acetylene, siliciureted hydrogen and especially phosphin, exert an injurious influence on the oxidation reaction by poisoning the catalyst. On the other hand these gaseous impurities in the amounts normally present, do not cause difficulty in the use of the impure ammonia for the neutralization of acids, such as sulfuric or nitric, to form ammonium sulfate or nitrate nor for the absorption of ammonia in water to form aqua ammonia.

My invention is based upon the discovery that if the first portion of the ammonia "run" is diverted to other uses, such as for the production of aqua ammonia, the latter stages of the "run" can be utilized directly for oxidation into oxids of nitrogen, since the generation of the aforesaid injurious impurities will occur almost exclusively during the first portion of the run.

Any suitable apparatus may be employed to carry out my improved process. In the accompanying drawing, I have illustrated one form of apparatus adapted for such purpose, in which the figure shown is a plan view.

Referring to the drawing, and the construction shown therein, the reference numeral 1 designates an autoclave in which ammonia is generated from material such, for example, as calcium cyanamid. An outlet pipe provided with branches 2 and 3 controlled by valves 2' and 3' respectively, serves to optionally deliver the ammonia from said autoclave to either an absorber 4 or to a multiple ammonia oxidizer composed of units 5, either with or without the interposition of a gas holder 6. As is evident the ammonia, either from the autoclave or the gas-holder, may, if desired, be temporarily diverted from the oxidizers by closing valve 5' and thereupon the gas will flow through branch pipe 7 into the absorber 4 during such time as valve 7' remains open.

Any suitable valve control arrangement may obviously be provided, without departing from the invention herein described, to enable the operator to throw the gas-holder or one or more of the units of the oxidizer into or out of communication with the system.

As an example of the preferred manner of performing my invention, I proceed as follows:—

The ground cyanamid is charged into the autoclave together with water and a dilute solution of caustic soda, the autoclave is closed and heat applied. When it is time to draw off the ammonia gas, the valve 2' is opened and ammonia, with its impurities, passes over into the absorber. As soon as the ammonia is passing over free, or substantially free, from volatile impurities, the valve 3' is opened and the valve 2' closed, so that the gas passes through the pipe from which it may go either to the ammonia oxidizers 5, to the gas holder, or through branch-pipe 7 and valve 7' to the absorber. By properly controlling valves 5' and 7' any desired proportion of gas can be run through either the oxidizers 5 or the absorber 4.

The importance of the above described process to the art can be appreciated when it is realized that at one time it was considered uneconomical to oxidize cyanamid ammonia with platinum contact substances (the universal catalyst for ammonia oxidation) owing to the expensive purification treatment which would have to be resorted to in order to eradicate contact poisons therefrom. It is possible, however, by the treatment above described, so simple that like many another important advance it seems almost obvious after being once disclosed, to not only obtain a very satisfactory yield of nitric acid by the oxidation of cyanamid ammonia but to accomplish the purification at an expense which is virtually negligible since the impure ammonia absorbed, prior to the commencement of the collection of the pure ammonia for passage over the catalyst, is readily salable as such or convertible by neutralization into valuable compounds as ammonium sulfate or nitrate.

Having thus described my invention, what I claim and desire to secure by Letters Patent of the United States is:

1. The process which consists in generating ammonia from oxygen-free, nitrogen compounds by hydrolysis thereof and conducting that portion of ammonia evolved after the generation of volatile contact poisons from said nitrogen compounds has ceased to a different destination from that to which the "first-run" ammonia was conducted.

2. The process of purifying ammonia produced from impure cyanamid, which consists in hydrolyzing cyanamid and continuously removing the ammonia evolved from contact with said cyanamid, and collecting the portion of ammonia evolved after the generation of phosphin from said cyanamid has substantially ceased, separately from that evolved during the generation of such phosphin.

3. The process of making nitrogen compounds from an alkaline-earth cyanamid, which consists in hydrolyzing an alkaline-earth cyanamid, simultaneously conducting the liberated ammonia into an absorbent medium until the generation of the phosphin from such cyanamid substantially ceases and thereupon conducting the phosphin-free ammonia in a mixture with air over a catalyst adapted to form nitric acid therefrom.

4. In the process of making nitric acid, the steps which consist in hydrolyzing impure, oxygen-free, nitrogen compounds, separating volatile products evolved during the period of the hydrolysis, in which substantial quantities of hydrogen compounds other than ammonia which are contact poisons are evolved in conjunction with ammonia, from the pure ammonia generated after the evolution of such contact poisons has ceased and utilizing the pure ammonia so separated for the manufacture of nitric acid synthetically.

5. The method of making nitrogen oxids from impure, oxygen-free compounds of nitrogen, which consists in hydrolyzing such oxygen-free compounds, continuously removing the evolved ammonia from said compounds until the evolution of volatile contact poisons from said oxygen-free compounds substantially ceases, and then subjecting the substantially pure ammonia subsequently evolved from said oxygen-free compounds, in a mixture with oxygen, to the action of a contact medium capable of converting the same into nitrogen oxids and substantially uncontaminated by the prior passage thereover of impure ammonia containing the contact poisons.

ALFRED H. WHITE.